(12) United States Patent
Morisaki et al.

(10) Patent No.: US 9,751,524 B2
(45) Date of Patent: Sep. 5, 2017

(54) HYBRID VEHICLE

(71) Applicant: TOYOTA JIDOSHA KABUSHIKI KAISHA, Toyota-shi, Aichi-ken (JP)

(72) Inventors: Keisuke Morisaki, Toyota (JP); Takahiro Nishigaki, Nagoya (JP); Daigo Ando, Nagoya (JP); Yuichiro Kawai, Ama-gun (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/258,129

(22) Filed: Sep. 7, 2016

(65) Prior Publication Data

US 2017/0066435 A1  Mar. 9, 2017

(30) Foreign Application Priority Data

Sep. 9, 2015 (JP) .................................. 2015-177563

(51) Int. Cl.
*B60W 20/16* (2016.01)

(52) U.S. Cl.
CPC ......... *B60W 20/16* (2016.01); *B60W 2530/12* (2013.01)

(58) Field of Classification Search
CPC ......... B60W 20/16; B60K 13/04; F01N 13/08
See application file for complete search history.

(56) References Cited

U.S. PATENT DOCUMENTS 6,266,956 B1 *  7/2001  Suzuki .................. B60K 6/24
                                                      180/65.235

FOREIGN PATENT DOCUMENTS

| JP | 2010-48178 | 3/2010 |
| JP | 2010-222978 | 10/2010 |
| JP | 2012-219746 | 11/2012 |

* cited by examiner

*Primary Examiner* — John Walters
*Assistant Examiner* — James Triggs
(74) *Attorney, Agent, or Firm* — Finnegan, Henderson, Farabow, Garrett & Dunner, LLP

(57) ABSTRACT

When a starting point water temperature Twst is equal to or lower than a threshold value Twref1, catalyst warm-up control is executed, and when a cooling water temperature Tw becomes higher than the threshold value Twref1 or an operation time top of an engine becomes equal to or higher than a threshold value topref1, the control of the engine is shifted from the catalyst warm-up control to normal control. When the starting point water temperature Twst is higher than the threshold value Twref1 and is equal to or lower than a threshold value Twref2, PN suppression control is executed, and when the cooling water temperature Tw of the engine becomes higher than the threshold value Twref2 or the operation time top of the engine becomes equal to or higher than a threshold value topref2, the control of the engine is shifted from the PN suppression control to the normal control.

7 Claims, 10 Drawing Sheets

HYBRID VEHICLE

INCORPORATION BY REFERENCE

The disclosure of Japanese Patent Application No. 2015-177563 filed on Sep. 9, 2015 including the specification, drawings and abstract is incorporated herein by reference in its entirety.

BACKGROUND

1. Technical Field

The disclosure relates to a hybrid vehicle, and particularly, to a hybrid vehicle including an engine, a motor, and a battery.

2. Description of the Related Art

In the related art, as an internal combustion engine system, there is suggested an internal combustion engine system which includes an internal combustion engine, and a particulate matter (PM) removing device provided in an exhaust passage of the internal combustion engine, and in which, when the cooling water temperature of the internal combustion engine is lower than a reference temperature and the number of PM particles in exhaust gas after passing through the PM removing device is more than a reference particle number, an operation point (engine rotational speed and engine load) of the internal combustion engine is changed so that the PM particle number in the exhaust gas from the internal combustion engine decreases (for example, refer to Japanese Patent Application Publication No. 2012-219746 (JP 2012-219746 A). In this system, a PM particle number in exhaust gas discharged out of the system is reduced by the above-described control.

Among hybrid vehicles which include an internal combustion engine and an electric motor for vehicle driving and a battery that exchanges power with this electric motor and which drive the engine while the engine is intermittently operated, there is a hybrid vehicle that executes the following first control or second control according to a cooling water temperature (starting point water temperature) at the time of the start of operation of the internal combustion engine. In the first control, when the starting point water temperature is equal to or lower than a first predetermined temperature, the output of the internal combustion engine is limited to a first predetermined output or lower, and a catalyst of an exhaust gas control apparatus of the internal combustion engine is warmed up until the cooling water temperature becomes higher than the first predetermined temperature. In the second control, when the starting point water temperature is higher than the first predetermined temperature and is equal to or lower than the second predetermined temperature, the output of the internal combustion engine is limited to a second predetermined output or lower that is greater than the first predetermined output and an increase in the PM particle number is suppressed until the cooling water temperature becomes higher than the second predetermined temperature. In this case, at the execution of the first control and the second control, when a rise in the cooling water temperature is relatively gentle, the execution times of the first control and the second control may become relatively long. If the execution times of the first control and the second control become relatively long, the time during which the output from the motor and eventually the discharge power from the battery are apt to be relatively great may continue for a relatively long time, and the power storage proportion of the battery may drop relatively greatly. For this reason, it is preferable to prevent the execution times of the first control and the second control from becoming relatively long.

SUMMARY

An object of the hybrid vehicle of the disclosure is to prevent time during which output from an engine is limited from becoming relatively long.

The hybrid vehicle of the first aspect of the disclosure is outlined by providing a hybrid vehicle including an engine and a motor for vehicle driving; a battery that exchanges power with the motor; a controller configured to control the engine and the motor so as to be driven depending on a required output for vehicle driving while the engine being intermittently operated, the controller, (i) executes normal control in which the engine is controlled so that a target output of the engine according to the required output is output from the engine when a starting point water temperature that is a cooling water temperature at the start of the operation of the engine is higher than a second predetermined temperature higher than a first predetermined temperature, (ii) executes first control in which the engine is controlled so that an output of the engine is limited to a first predetermined output or lower and a catalyst of an exhaust gas control apparatus of the engine is warmed up when the starting point water temperature is equal to or lower than the first predetermined temperature, then shifts to the normal control when the cooling water temperature becomes higher than the first predetermined temperature or when a first predetermined time has lapsed from the start of the operation of the engine, (iii) executes second control in which the engine is controlled so that the output of the engine is limited to a second predetermined output or lower that is greater than the first predetermined output and a discharge amount of particulate matter from the engine is suppressed when the starting point water temperature is higher than the first predetermined temperature and is equal to or lower than the second predetermined temperature, and then, shifts to the normal control when the cooling water temperature becomes higher than the second predetermined temperature or when a second predetermined time has lapsed from the start of the operation of the engine.

In the hybrid vehicle according to the first aspect, the engine and the motor are controlled so as to be driven depending on the required output for vehicle driving while the engine being intermittently operated. Then, the normal control is executed in which the engine is controlled so that the target output of the engine according to the required output is output from the engine when the starting point water temperature that is the cooling water temperature at the start of the operation of the engine is higher than the second predetermined temperature higher than the first predetermined temperature. Additionally, the first control is executed in which the engine is controlled so that the output of the engine is limited to the first predetermined output or lower and the catalyst of the exhaust gas control apparatus of the engine is warmed up when the starting point water temperature is equal to or lower than the first predetermined temperature, and then the shift to the normal control is performed when the cooling water temperature becomes higher than the first predetermined temperature or when the first predetermined time has lapsed from the start of the operation of the engine. Moreover, the second control is performed in which the engine is controlled so that the output of the engine is limited to the second predetermined output or lower that is greater than the first predetermined output and the discharge amount of particulate matter from the engine is suppressed when the starting point water temperature is higher than the first predetermined temperature and is equal to or lower than the second predetermined temperature, and then, a shift to the normal control is performed when the cooling water temperature becomes higher than the second predetermined temperature or when the second predetermined time has lapsed from the start of the operation of the engine. Therefore, since the shift to the normal control is performed when the cooling water temperature becomes higher than the first predetermined temperature or when the first predetermined time has lapsed from the start of the operation of the engine, during the execution of the first control, the execution time of the first control can be prevented from becoming relatively longer when a rise in the cooling water temperature is relatively gentle, as compared to the shift to the normal control performed only when the cooling water temperature becomes higher than the first predetermined temperature. Additionally, since the shift to the normal control is performed when the cooling water temperature becomes higher than the second predetermined temperature or when the second predetermined time has lapsed from the start of the operation of the engine, during the execution of the second control, the execution time of the second control can be prevented from becoming relatively longer when a rise in the cooling water temperature is relatively gentle, as compared to the shift to the normal control performed only when the cooling water temperature becomes higher than the second predetermined temperature. As a result, the time during which the output from the motor and eventually the discharge power from the battery are apt to become relatively great can be prevented from continuing for a relatively long time, and the power storage proportion of the battery can be prevented from declining relatively greatly.

In such a hybrid vehicle of the first aspect of the disclosure, the second predetermined output may be set so that the second predetermined output when the starting point water temperature is low becomes smaller than that when the starting point water temperature is high. When the starting point water temperature is low, it is believed that, as compared to that when the starting point water temperature is high, the temperature within the cylinder of the engine is low and the discharge amount of particulate matter from the engine is apt to increase. The discharge amount of particulate matter from the engine can be more appropriately suppressed by setting the second predetermined output so that the output of the engine when the starting point water temperature is low becomes smaller than that when the starting point water temperature is high.

Additionally, in such a hybrid vehicle of the first aspect of the disclosure, the second predetermined time may be set so that the second predetermined time when the starting point water temperature is low becomes longer than that when the starting point water temperature is high. As described above, when the starting point water temperature is low, it is believed that, as compared to that when the starting point water temperature is high, the temperature within the cylinder of the engine is low and the discharge amount of particulate matter from the engine is apt to increase. Therefore, the execution time (time for suppressing particulate matter from the engine) of the second control can be made more suitable by setting the second predetermined time so that the second predetermined time when the starting point water temperature is low becomes longer than that when the starting point water temperature is high.

In the hybrid vehicle of the first aspect of the disclosure, when the starting point water temperature is higher than the first predetermined temperature and is equal to or lower than the second predetermined temperature, the controller may shift to the normal control after the second control is executed when a stop time from the end of a previous operation of the engine to the start of a current operation of the engine is equal to or greater than a third predetermined time, and may execute the normal control without executing the second control when the stop time is smaller than the third predetermined time. When the stop time is relatively short, it is believed that the temperature within the cylinder of the engine is still relatively high and the discharge amount of particulate matter from the engine does not increase so much. The discharge amount of particulate matter from the engine can be suppressed by shifting to the normal control after the second control is executed when the stop time is equal to or greater than the third predetermined time. When the stop time is smaller than the third predetermined time, the output from the motor and eventually the discharge power from the battery can be further prevented from becoming relatively great by executing the normal control without executing the second control.

In such a hybrid vehicle of the first aspect of the disclosure, the third predetermined time may be set so that the third predetermined time when the starting point water temperature is low becomes shorter than that when the starting point water temperature is high. When the starting point water temperature is low, it is believed that, as compared to that when the starting point water temperature is high, the temperature within the cylinder of the engine is apt to be low. Whether or not the second control is executed can be more appropriately determined by setting the third predetermined time so that the third predetermined time when the starting point water temperature is low becomes shorter than that when the starting point water temperature is high.

In the hybrid vehicle of the disclosure, the controller may shift to the normal control when an integrated air quantity from the start of the operation of the engine reaches a predetermined air quantity or greater even when the cooling water temperature does not become higher than the second predetermined temperature and the second predetermined time has not lapsed from the start of the operation of the engine, during the execution of the second control. If this is the case, the execution time of the second control can be further prevented from becoming long.

In such a hybrid vehicle of the first aspect of the disclosure, the predetermined air quantity may be set so that the predetermined air quantity when the starting point water temperature is low becomes greater than that when the starting point water temperature is high. As described above, when the starting point water temperature is low, it is believed that, as compared to that when the starting point water temperature is high, the temperature within the cylinder of the engine is low and the discharge amount of particulate matter from the engine is apt to increase. Therefore, the execution time (time for suppressing particulate matter from the engine) of the second control can be made more suitable by setting the predetermined air quantity so that the predetermined air quantity when the starting point water temperature is low becomes greater than that when the starting point water temperature is high.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Next, modes for carrying out the disclosure will be described using examples.

Figure 1:
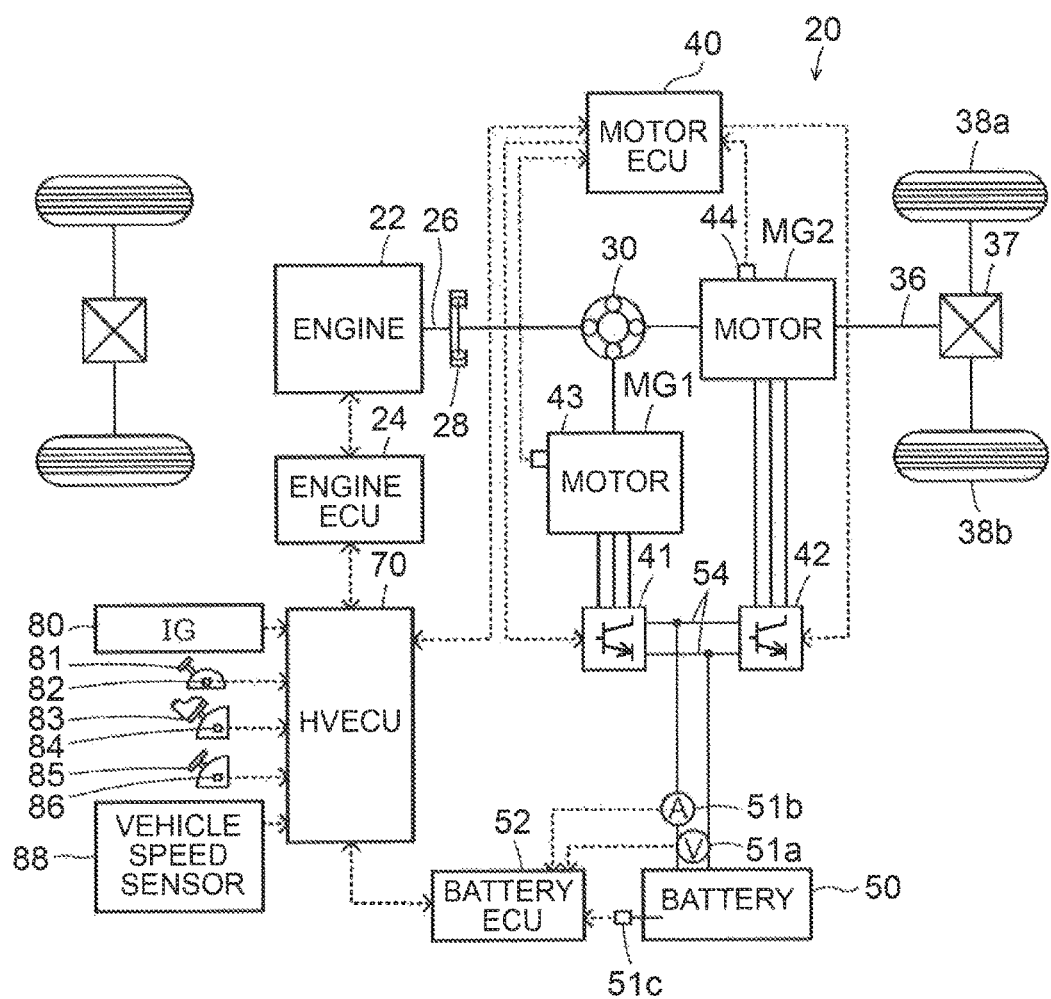
FIG. 1 is a configuration view illustrating the outline of the configuration of a hybrid vehicle 20 as an example of the disclosure.

FIG. 1 is a configuration view illustrating the outline of the configuration of a hybrid vehicle 20 as an example of the disclosure. The hybrid vehicle 20 of the example, as illustrated in the drawing, includes an engine 22, a planetary gear 30, motors MG1, MG2, inverters 41, 42, a battery 50, and an electronic control unit 70 for a hybrid vehicle (hereinafter referred to as an HVECU).

Figure 2:
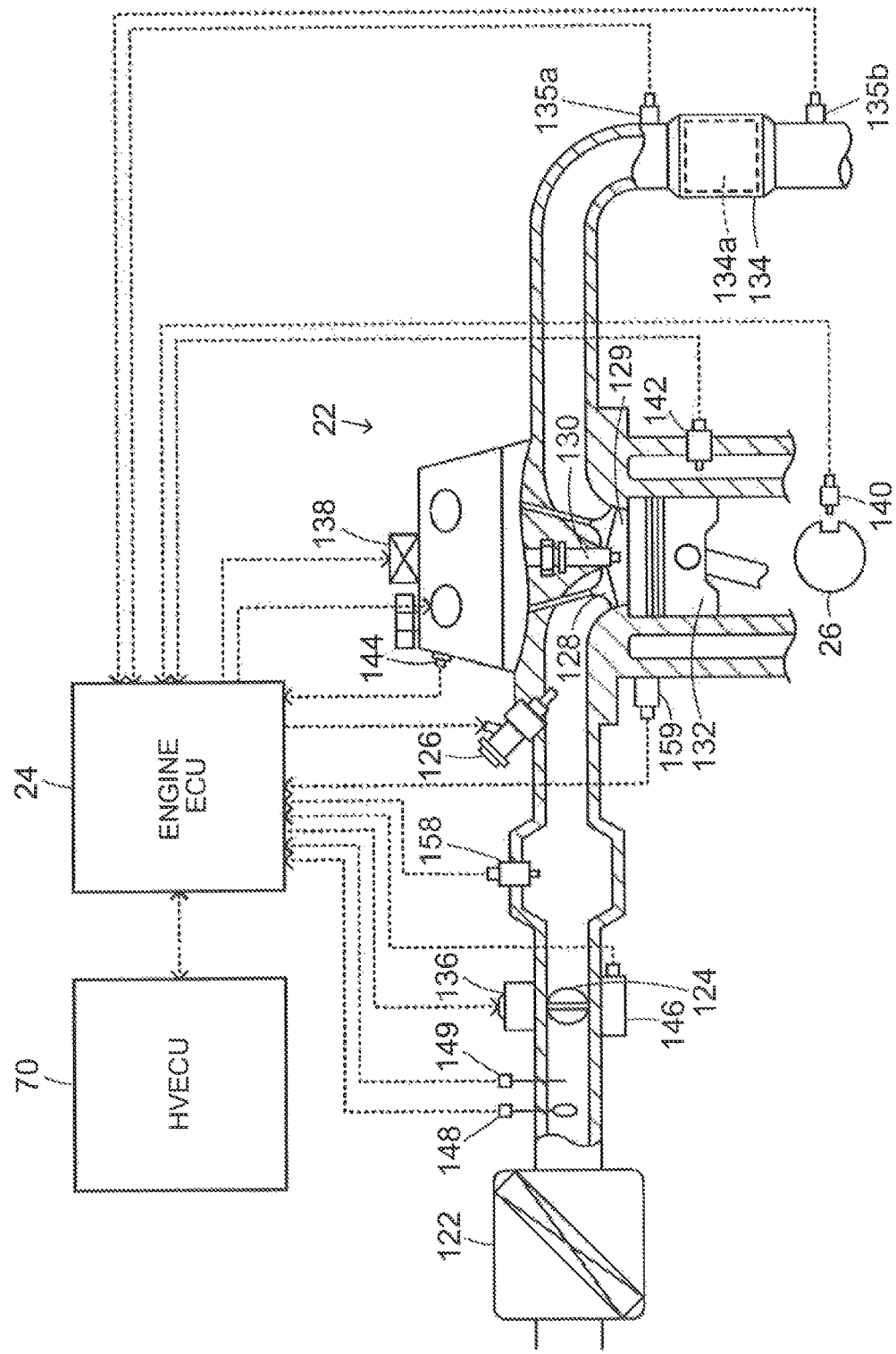
FIG. 2 is a configuration view illustrating the outline of the configuration of the engine 22.

The engine 22 is constituted as an internal combustion engine that outputs power by using gasoline, gas oil, or the like as fuel. FIG. 2 is a configuration view illustrating the outline of the configuration of the engine 22. The engine 22, as illustrated in FIG. 2, inhales air purified by an air cleaner 122 via a throttle valve 124, and injects fuel from a fuel injection valve 126 to mix air with fuel. Then, by inhaling this air-fuel mixture into a combustion chamber 129 via an intake valve 128 and exploding and combusting the air-fuel mixture with electrical spark caused by an ignition plug 130, a reciprocal motion of a piston 132 depressed by the energy of the explosion and combustion is converted into a rotational motion of a crankshaft 26. Exhaust gas from the combustion chamber 129 is discharged to external air via a purification apparatus 134 having a purification catalyst (ternary catalyst) 134a that purifies detrimental constituents of carbon monoxide (CO), hydrocarbon (HC), and nitrogen oxides (NOx).

The operation of the engine 22 is controlled by an electronic control unit 24 for an engine (hereinafter referred to as an "engine ECU"). Although not illustrated, the engine ECU 24 is constituted as a microprocessor centered on a CPU, and includes, in addition to the CPU, a ROM that stores a processing program, a RAM that temporarily stores data, input and output ports, and a communication port. Signals from various sensors required to control the operation of the engine 22 are input to the engine ECU 24 via the input port. The signals to be input to the engine ECU 24 may include the followings.

A crank angle $\theta cr$ from a crank position sensor 140 that detects the rotational position of the crankshaft 26

A cooling water temperature Tw from a water temperature sensor 142 that detects the temperature of cooling water of the engine 22

Cam angles $\theta ci$, $\theta co$ from a cam position sensor 144 that detects the rotational position of an intake cam shaft that opens and closes the intake valve 128 and the rotational position of an exhaust cam shaft that opens and closes an exhaust valve A throttle opening degree TH from a throttle valve position sensor 146 that detects the position of the throttle valve 124

The quantity Qa of intake air from an air flow meter 148 attached to an intake pipe An intake temperature Ta from a temperature sensor 149 attached to the intake pipe An intake air pressure Pin from an intake air pressure sensor 158 that detects pressure within the intake pipe An air-fuel ratio AF from an air-fuel ratio sensor 135a An oxygen signal O2 from an oxygen sensor 135b A knock signal Ks from a knock sensor 159 that is attached to a cylinder block to detect vibration caused by occurrence of knocking Various control signals for controlling the operation of the engine 22 are output from the engine ECU 24 via the output port. The signals to be output from the engine ECU 24 may include the followings.

A drive control signal to a throttle motor 136 that regulates the position of the throttle valve 124

A drive control signal to a fuel injection valve 126

A drive control signal to an ignition coil 138 integrated with an ignitor

The engine ECU 24 is connected to the HVECU 70 via the communication port, and controls the operation of the engine 22 depending on a control signal from the HVECU 70 and outputs data about the operational state of the engine 22 to the HVECU 70 if necessary. The engine ECU 24 calculates the rotational speed of the crankshaft 26, that is, the rotational speed Ne of the engine 22, on the basis of the crank angle $\theta cr$ from the crank position sensor 140. Additionally, the engine ECU 24 calculates the volume efficiency (the ratio of volume of air actually inhaled in one cycle to stroke volume per one cycle of the engine 22) KL, on the basis of the quantity Qa of intake air from the air flow meter 148 and the rotational speed Ne of the engine 22.

As illustrated in FIG. 1, the planetary gear 30 is constituted as a single pinion type planetary gear mechanism. A rotor of the motor MG1 is connected to a sun gear of the planetary gear 30. A driving shaft 36 coupled to driving wheels 38a, 38b via a differential gear 37 is connected to a ring gear of the planetary gear 30. The crankshaft 26 of the engine 22 is connected to a carrier of the planetary gear 30 via a damper 28 serving as a torsion element.

The motor MG1 is constituted as, for example, a synchronous generator motor, and as described above, the rotor is connected to the sun gear of the planetary gear 30. The motor MG2 is constituted as, for example, a synchronous generator motor, and a rotor thereof is connected to the driving shaft 36. The inverters 41, 42 are connected to a battery 50 via a power line 54. The motors MG1, MG2 are rotationally driven by controlling switching of a plurality of switching elements (not illustrated) of the inverters 41, 42 using an electronic control unit 40 for a motor (hereinafter referred to as a "motor ECU").

Although not illustrated, the motor ECU 40 is constituted as a microprocessor centered on a CPU, and includes, in addition to the CPU, a ROM that stores a processing program, a RAM that temporarily stores data, input and output ports, and a communication port. Signals from various sensors required to control the driving of the motors MG1, MG2 are input to the motor ECU 40 via the input port. The signals to be input to the motor ECU 40 may include the followings.

Rotational positions θm1 and θm2 from rotational position detecting sensors 43, 44 that detect rotational positions of the rotors of the motors MG1, MG2

Phase currents from current sensors that detect currents that flow to respective phases of the motors MG1, MG2

Switching control signals or the like to the plurality of switching elements (not illustrated) of the inverters 41, 42 are output from the motor ECU 40 via the output port. The motor ECU 40 is connected to the HVECU 70 via the communication port, and controls the operation of the motors MG1, MG2 depending on a control signal from the HVECU 70 and outputs data about the drive state of the motors MG1, MG2 to the HVECU 70 if necessary. In addition, the motor ECU 40 calculates the rotational speeds Nm1, Nm2 of the motors MG1, MG2, on the basis of the rotational positions θm1 and θm2 of the rotors of the motors MG1, MG2 from the rotational position detecting sensors 43, 44.

The battery 50 is constituted as, for example, a lithium ion secondary battery or a nickel hydrogen secondary battery, and as described above, is connected to the inverters 41, 42 via the power line 54. The battery 50 is managed by an electronic control unit 52 for a battery (hereinafter referred to as a "battery ECU").

Although not illustrated, the battery ECU 52 is constituted as a microprocessor centered on a CPU, and includes, in addition to the CPU, a ROM that stores a processing program, a RAM that temporarily stores data, input and output ports, and a communication port. Signals from various sensors required to manage the battery 50 are input to the battery ECU 52 via the input port. The signals to be input to the battery ECU 52 may include the followings.

A battery voltage Vb from a voltage sensor 51a installed between terminals of the battery 50

A battery current Ib from a current sensor 51b attached to an output terminal of the battery 50

A battery temperature Tb from a temperature sensor 51c attached to the battery 50

The battery ECU 52 is connected to the HVECU 70 via the communication port, and outputs data about the state of the battery 50 to the HVECU 70 if necessary. The battery ECU 52 calculates a power storage rate SOC, on the basis of an integrated value of the battery current Ib from the current sensor 51b. The power storage rate SOC is a rate of the capacity of power that is dischargeable from the battery 50 to the total capacity of the battery 50. Additionally, the battery ECU 52 calculates input and output limits Win, Wout, on the basis of the calculated power storage rate SOC, and the battery temperature Tb from the temperature sensor 51c. The input and output limits Win, Wout of the battery 50 are maximum allowable powers that may charge and discharge the battery 50.

Although not illustrated, the HVECU 70 is constituted as a microprocessor centered on a CPU, and includes, in addition to the CPU, a ROM that stores a processing program, a RAM that temporarily stores data, input and output ports, and a communication port. Signals from various sensors are input to the HVECU 70 via the input port. The signals to be input to the HVECU 70 may include the followings.

An ignition signal from an ignition switch 80

A shift position SP from a shift position sensor 82 that detects the operative position of a shift lever 81

An accelerator opening degree Acc from an accelerator pedal position sensor 84 that detects the amount of stepping of an accelerator pedal 83

A brake pedal position BP from a brake pedal position sensor 86 that detects the amount of stepping of a brake pedal 85

A vehicle speed V from a vehicle speed sensor 88

The HVECU 70 is connected to the engine ECU 24, the motor ECU 40, and the battery ECU 52 via the communication port, and performs the exchange of various control signals, and data of the engine ECU 24, the motor ECU 40, the battery ECU 52.

In the hybrid vehicle 20 of the example configured in this way, a required torque Tp* of the driving shaft 36 is set on the basis of the accelerator opening degree Acc and the vehicle speed V, and the engine 22 and the motors MG1, MG2 are controlled so that the required torque Tp* is output to the driving shaft 36 within ranges of the input and output limits Win, Wout of the battery 50, with the intermittent operation of the engine 22.

Figure 3:
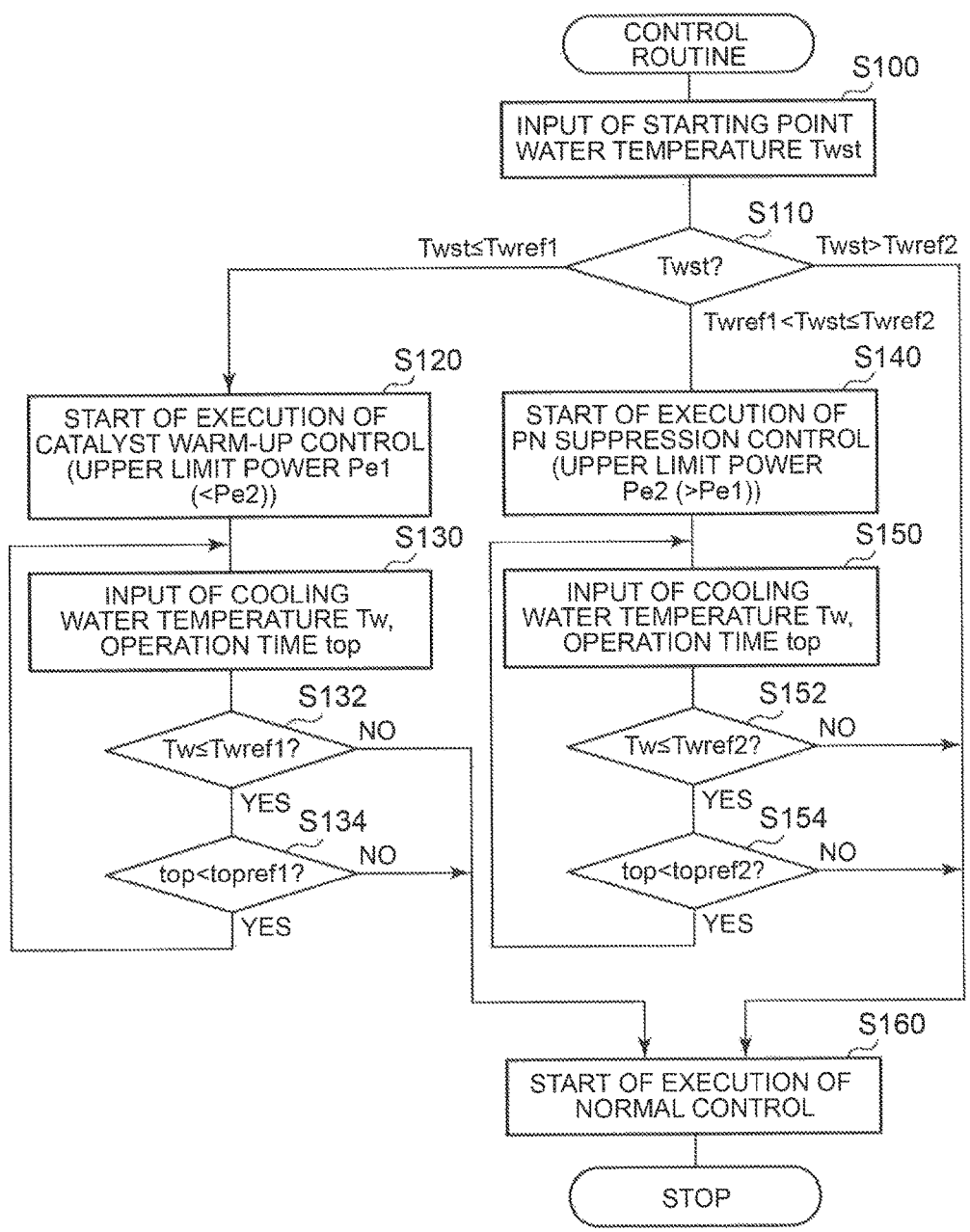
FIG. 3 is a flowchart illustrating an example of a control routine to be executed by an HVECU 70 of the example.

Next, the operation of the hybrid vehicle 20 of the example configured in this way, and particularly, the control of the engine 22 will be described. FIG. 3 is a flowchart illustrating an example of a control routine to be executed by the HVECU 70 of the example. The main routine is executed when the operation of the engine 22 is started.

If the control routine is executed, first, the starting point water temperature Twst is input to the HVECU 70 (Step S100). Here, the starting point water temperature Twst is given by inputting a value, which is detected by the water temperature sensor 142 when the operation of the engine 22 is started (when the execution of the main routine is started), through communication from the engine ECU 24.

Subsequently, the starting point water temperature Twst is compared with a threshold value Twref1, and a threshold value Twref2 higher than the threshold value Twref1 (Step S110). Here, the threshold value Twref1 is a threshold value used to estimate (determine) whether or not a purification catalyst 134a is in an inactive state (hereinafter referred to as a "first predetermined state"), and for example, 35° C., 40° C., 45° C., or the like can be used. The threshold value Twref2 is a threshold value used to estimate (determine) whether or not there is a state (hereinafter referred to as a "second predetermined state") where, since the temperature within the combustion chamber 129 is relatively low and fuel is apt not to be atomized, combustion is apt to become unstable and the discharge amount of particulate matter from the engine 22 (discharge particle number (PN)) is apt to increase, and for example, 55° C., 60° C., 65° C., or the like can be used.

In Step S110, when the starting point water temperature Twst is higher than the threshold value Twref2, it is determined that the state of the purification catalyst 134a is neither the first predetermined state nor the second predetermined state, execution of normal control of the engine 22 is started (Step S160), and the main routine is ended. Here, the operation when the engine 22 is normally controlled will be described. In this case, the HVECU 70 calculates a drive power Pp* of the driving shaft 36 by multiplying the required torque Tp* of the driving shaft 36 by a rotational speed Np (for example, the rotational speed Nm2 of the motor MG2, or the like) of the driving shaft 36, and calculates a required power Pv* of the vehicle by subtracting a charge/discharge required power Pb* (a positive value when being discharged from the battery 50) of the battery 50 from the drive power Pp*. Subsequently, the required power Pv* of the vehicle is set to a target power Pe* of the engine 22, and a target rotational speed Ne* and a target torque Te* of the engine 22 are set on the basis of the target power Pe* and an operation line for efficiently operating the engine 22. Next, a torque command Tm1* of the motor MG1 is set so that the rotational speed Ne of the engine 22 may become the target rotational speed Ne*, and a torque command Tm2* of the motor MG2 is set so that the required torque Tp* is output to the driving shaft 36 within the ranges of the input and output limits Win, Wout of the battery 50. Then, the target rotational speed Ne* and the target torque Te* of the engine 22 are transmitted to the engine ECU 24, and the torque commands Tm1*, Tm2* of the motors MG1, MG2 are transmitted to the motor ECU 40. The engine ECU 24 performs an intake air amount control, a fuel injection control, an ignition control, and the like of the engine 22 so that the engine 22 is operated at an operation point based on the target rotational speed Ne* and the target torque Te*. The motor ECU 40 performs switching control of the switching elements of the inverters 41, 42 so that the motors MG1, MG2 are driven by the torque commands Tm1*, Tm2*.

In Step S110, when the starting point water temperature Twst is equal to or lower than the threshold value Twref1, it is determined that the current state is the first predetermined state and the second predetermined state, and execution of catalyst warm-up control of the engine 22 is started (Step S120). Here, the catalyst warm-up control of the engine 22 is a control in which the engine 22 is controlled so that the power Pe of the engine 22 is limited to an upper limit power Pe1 or lower and warm-up (hereinafter referred to as "catalyst warm-up") of the purification catalyst 134a is performed. As the upper limit power Pe1, for example, 0.8 kW, 1.0 kW, 1.2 kW, or the like can be used. In this case, the HVECU 70 limits the required power Pv* of the above-described vehicle to the upper limit power Pe1 (upper limit guard) to set the target power Pe* of the engine 22, and similar to the normal control, sets the target rotational speed Ne* and the target torque Te* of the engine 22 and the torque commands Tm1*, Tm2* of the motors MG1, MG2 to transmit these settings to the engine ECU 24 and the motor ECU 40. The engine ECU 24 controls the ignition timing of the engine 22 as to be later than an ignition timing for efficiently operating the engine 22 and to be suitable for the catalyst warm-up, in the ignition control. Additionally, in the intake air amount control and the fuel injection control, a throttle opening degree and a fuel injection amount are regulated so that the engine 22 is operated at an operation point based on the target rotational speed Ne* and the target torque Te*, using the ignition timing as an ignition timing suitable for the catalyst warm-up. The catalyst warm-up can be promoted by controlling the ignition timing as to be suitable for the catalyst warm-up in this way.

Next, the cooling water temperature Tw of the engine 22 and an operation time top of the engine 22 are input (Step S130). Here, the cooling water temperature Tw is given by inputting a value detected by the water temperature sensor 142 through communication from the engine ECU 24. Additionally, the operation time top of the engine 22 is given by inputting a value clocked by a timer (not illustrated) as the time from the start of the operation of the engine 22.

Subsequently, the cooling water temperature Tw of the engine 22 is compared with the threshold value Twref1 (Step S132), the operation time top of the engine 22 is compared with a threshold value topref1, and a return to Step S130 is performed when the cooling water temperature Tw of the engine 22 is equal to or lower than the threshold value Twref1 and the operation time top of the engine 22 is lower than the threshold value topref1 (Step S134). Then, while processing of Steps S130 to S134 is executed, when the cooling water temperature Tw of the engine 22 becomes higher than the threshold value Twref1 in Step S132 or when the operation time top of the engine 22 becomes equal to or higher than the threshold value topref1 in Step S134, the execution of the catalyst warm-up control of the engine 22 is executed, the execution of the normal control of the engine 22 is started (Step S160), and the main routine is ended. Here, the threshold value Twref1 and the threshold value topref1 are threshold values used to determine whether or not the execution of the catalyst warm-up control may be ended (whether a shift to the normal control may be performed). As the threshold value topref, for example, 65 sec, 70 sec, 75 sec, or the like can be used.

In this way, by shifting the control of the engine 22 from the catalyst warm-up control to the normal control when the cooling water temperature Tw of the engine 22 becomes higher than the threshold value Twref1 or the operation time top of the engine 22 becomes equal to or higher than the threshold value topref1, the execution time of the catalyst warm-up control can be prevented from becoming relatively long when a rise in the cooling water temperature Tw becomes relatively gentle, as compared to a case where the control of the engine 22 is shifted from the catalyst warm-up control to the normal control when the cooling water temperature Tw becomes higher than the threshold value Twref1. Accordingly, the time during which the output from the motor MG2 and eventually the discharge power from the battery 50 is apt to become great can be prevented from continuing relatively long, and the power storage proportion SOC of the battery 50 can be prevented from declining relatively greatly.

In Step S110, when the starting point water temperature Twst is higher than the threshold value Twref1 and equal to or lower than the threshold value Twref2, it is determined that the current state is not the first predetermined state but the second predetermined state, and the execution of the PN suppression control of the engine 22 is started (Step S140). Here, the PN suppression control of the engine 22 is a control in which the engine 22 is controlled so that the power Pe of the engine 22 is limited to the upper limit power Pe2 or lower and the discharge amount of particulate matter from the engine 22 is suppressed. The upper limit power Pe2 is greater than the upper limit power Pe1. As the upper limit power Pe2, for example, 4.5 kW, 5.0 kW, 5.5 kW, or the like can be used. In this case, the HVECU 70 limits (upper limit guard) the required power Pv* of the above-described vehicle to the upper limit power Pe2 to set the target power Pe* of the engine 22, and similar to the normal control, sets the target rotational speed Ne* and the target torque Te* of the engine 22 and the torque commands Tm1*, Tm2* of the motors MG1, MG2 to transmit these settings to the engine ECU 24 and the motor ECU 40. By limiting the power Pe from the engine 22 to the upper limit power Pe2 or lower in this way, the discharge amount of particulate matter from the engine 22 can be suppressed as compared to a case where the Power Pe is not limited to the upper limit power Pe2 or lower.

Next, the cooling water temperature Tw of the engine 22 and the operation time top of the engine 22 are input (Step S150), the cooling water temperature Tw of the engine 22 is compared with the threshold value Twref2 (Step S152), the operation time top of the engine 22 is compared with the threshold value topref2 (Step S154), and a return to Step S150 is performed when the cooling water temperature Tw of the engine 22 is equal to or lower than the threshold value Twref2 and the operation time top of the engine 22 is lower than the threshold value topref2. Then, while processing of Steps S150 to S154 is executed, when the cooling water temperature Tw of the engine 22 becomes higher than the threshold value Twref2 in Step S152 or when the operation time top of the engine 22 becomes equal to or higher than the threshold value topref2 in Step S154, the execution of the PN suppression control of the engine 22 is executed, the execution of the normal control of the engine 22 is started (Step S160), and the main routine is ended. Here, the threshold value Twref2 and the threshold value topref2 are threshold values used to determine whether or not the execution of the PN suppression control may be ended (whether a shift to the normal control may be performed). As the threshold value topref, for example, 3 sec, 4 sec, 5 sec, or the like can be used.

In this way, by shifting the control of the engine 22 from the PN suppression control to the normal control when the cooling water temperature Tw of the engine 22 becomes higher than the threshold value Twref2 or the operation time top of the engine 22 becomes equal to or higher than the threshold value topref2, the execution time of the PN suppression control can be prevented from becoming relatively long when a rise in the cooling water temperature Tw becomes relatively gentle, as compared to a case where the control of the engine 22 is shifted from the PN suppression control to the normal control when the cooling water temperature Tw becomes higher than the threshold value Twref2. Accordingly, the time during which the output from the motor MG2 and eventually the discharge power from the battery 50 is apt to become great can be prevented from continuing relatively long, and the power storage proportion SOC of the battery 50 can be prevented from declining relatively greatly.

In addition, in the example, during the execution of the catalyst warm-up control, when the cooling water temperature Tw of the engine 22 becomes higher than the threshold value Twref1 or when the operation time top of the engine 22 becomes equal to or higher than the threshold value topref1, the control of the engine 22 is not shifted from the catalyst warm-up control to the PN suppression control but is shifted from the catalyst warm-up control to the normal control even if the cooling water temperature Tw is equal to or lower than the threshold value Twref2. It is believed that this is because the temperature within the cylinder of the engine 22 becomes high to a certain degree even if the cooling water temperature Tw is equal to or lower than the threshold value Twref2 when the operation of the engine 22 is performed for a certain amount of time.

In the hybrid vehicle 20 of the example described above, when the starting point water temperature Twst is higher than the threshold value Twref2 and higher than the threshold value Twref1, the required power Pv* of the vehicle is set to the target power Pe* of the engine 22, and the normal control of the engine 22 is executed. When the starting point water temperature Twst is equal to or lower than the threshold value Twref1, the required power Pv* of the vehicle is limited (upper limit guard) to the upper limit power Pe1, the target power Pe* is set, and the catalyst warm-up control of the engine 22 is executed. When the cooling water temperature Tw of the engine 22 becomes higher than the threshold value Twref1 or the operation time top of the engine 22 becomes equal to or higher than the threshold value topref1, the control of the engine 22 is shifted from the catalyst warm-up control to the normal control. When the starting point water temperature Twst is higher than the threshold value Twref1 and is equal to or lower than the threshold value Twref2, the required power Pv* of the vehicle is limited (upper limit guard) to the upper limit power Pe2 that is greater than upper limit power Pe1, the target power Pe* is set, and the PN suppression control of the engine 22 is executed. When the cooling water temperature Tw of the engine 22 becomes higher than the threshold value Twref2 and the operation time top of the engine 22 becomes equal to or higher than the threshold value topref2, the control of the engine 22 is shifted from the PN suppression control to the normal control. Accordingly, when a rise in the cooling water temperature Tw of the engine 22 is relatively gentle, the execution time of the catalyst warm-up control and the PN suppression control can be prevented from becoming relatively long. As a result, the time during which the output from the motor MG2 and eventually the discharge power from the battery 50 is apt to become great can be prevented from continuing relatively long, and the power storage proportion SOC of the battery 50 can be prevented from declining relatively greatly.

Figure 4:
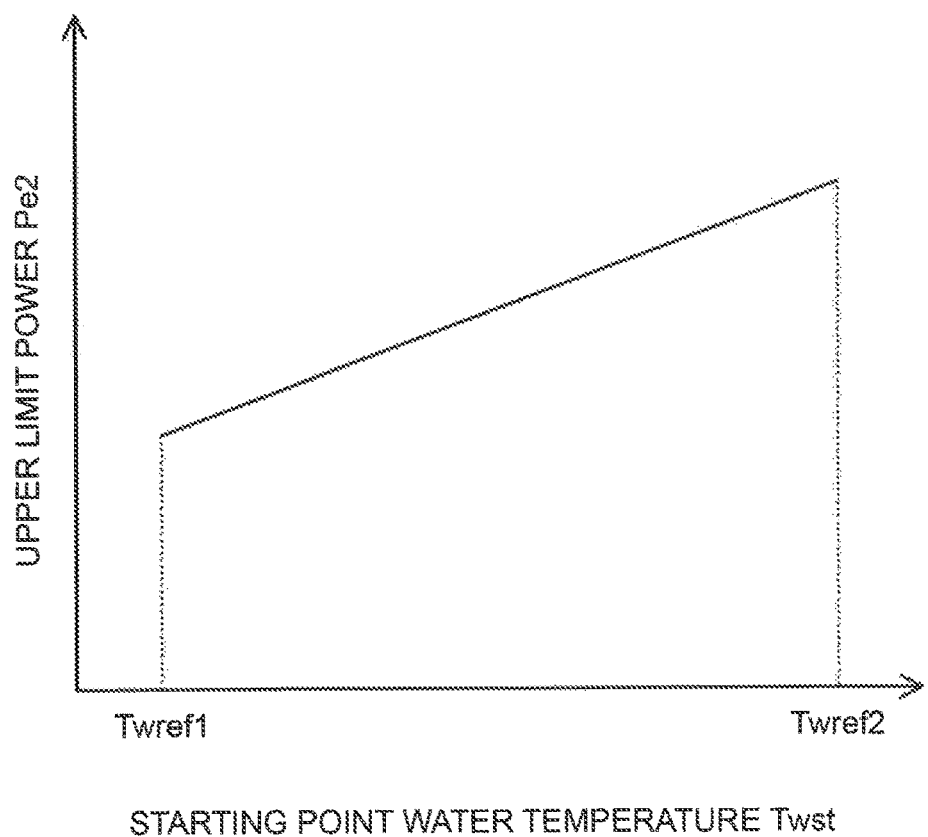
FIG. 4 is an explanatory view illustrating an example of a map in which a relationship between starting point water temperature Twst and upper limit power Pe2 is determined.

In the hybrid vehicle 20 of the example, a fixed value is used as the upper limit power Pe2. However, the upper limit power Pe2 may be set according to the starting point water temperature Twst. In this case, the upper limit power Pe2 can be set, for example, by determining the relationship between the starting point water temperature Twst and the upper limit power Pe2 and storing the relationship in advance as a map in a ROM (not illustrated), and by deriving a corresponding upper limit power Pe2 if the starting point water temperature Twst is given. An example of the map in which the relationship between the starting point water temperature Twst and the upper limit power Pe2 is determined is illustrated in FIG. 4. In the example of FIG. 4, the upper limit power Pe2 is set so that the upper limit power when the starting point water temperature Twst is low becomes smaller than that when the starting point water temperature is high, specifically, becomes smaller as the starting point water temperature Twst becomes lower. For example, when the starting point water temperature Twst is near the threshold value Twref1, 4.5 kW, 5.0 kW, 5.5 kW, or the like is set to the upper limit power Pe2, and when the starting point water temperature Twst is near the threshold value Twref2, 7.5 kW, 8.0 kW, 8.5 kW, or the like is set to the upper limit power Pe2. When the starting point water temperature Twst is low, it is believed that, as compared to that when the starting point water temperature Twst is high, the temperature within the cylinder of the engine 22 is low and the discharge amount of particulate matter from the engine 22 is apt to increase. Therefore, the discharge amount of particulate matter from the engine 22 can be more appropriately suppressed by setting the upper limit power Pe2 so that the upper limit power when the starting point water temperature Twst is low becomes smaller than that when the starting point water temperature is high.

Figure 5:
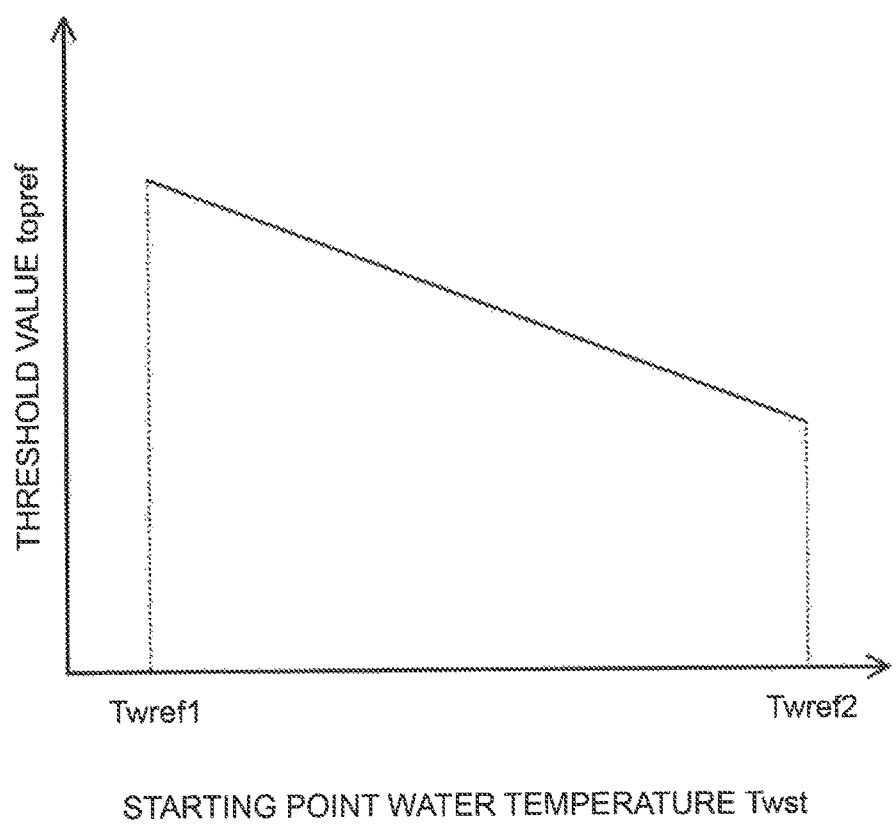
FIG. 5 is an explanatory view illustrating an example of a map in which a relationship between the starting point water temperature Twst and threshold value topref2 is determined.

In the hybrid vehicle 20 of the example, a fixed value is used as the threshold value topref2. However, the threshold value topref2 may be set according to the starting point water temperature Twst. In this case, the threshold value topref2 may be set, for example, by determining the relationship between the starting point water temperature Twst and the threshold value topref2 and storing the relationship in advance as a map in a ROM (not illustrated), and by deriving a corresponding threshold value topref2 from this map if the starting point water temperature Twst is given. An example of the map in which the relationship between the starting point water temperature Twst and the threshold value topref2 is determined is illustrated in FIG. 5. In the example of FIG. 5, the threshold value topref2 is set so that the threshold value when the starting point water temperature Twst is low becomes greater than that when the starting point water temperature is high, specifically, becomes greater as the starting point water temperature Twst becomes lower. For example, when the starting point water temperature Twst is near the threshold value Twref1, 3 sec, 4 sec, 5 sec, or the like is set to the threshold value topref2, and when the starting point water temperature Twst is near the threshold value Twref2, 1 sec, 1.5 sec, 2 sec, is set to the threshold value topref2. As described above, when the starting point water temperature Twst is low, it is believed that, as compared to that when the starting point water temperature Twst is high, the temperature within the cylinder of the engine 22 is low and the discharge amount of particulate matter from the engine 22 is apt to increase. Therefore, the execution time (time for suppressing particulate matter from the engine 22) of the PN suppression control can be made more suitable by setting the threshold value topref2 so that so that the threshold value topref2 when the starting point water temperature Twst is low becomes longer than that when the starting point water temperature Twst is high.

Figure 6:
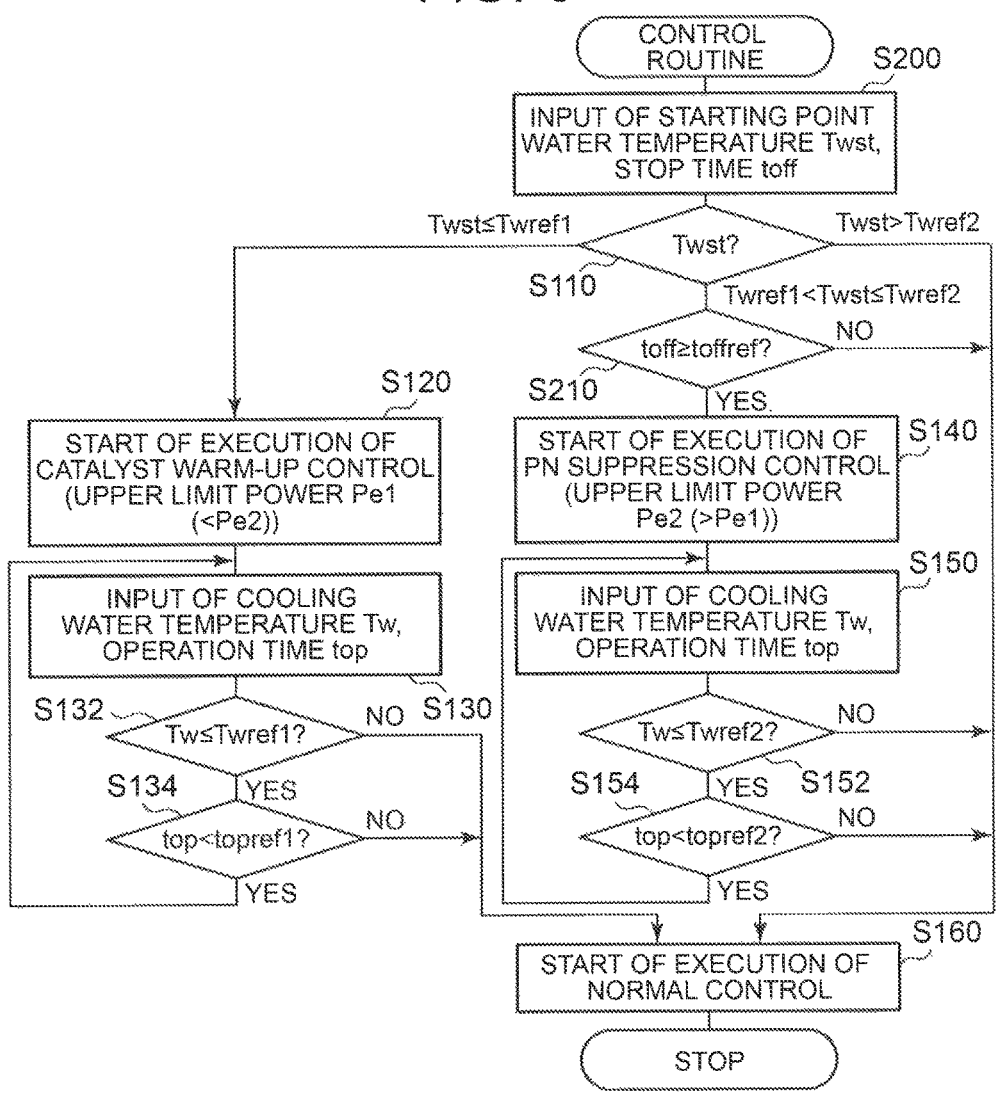
FIG. 6 is a flowchart illustrating an example of a control routine of a modification example.

In the hybrid vehicle 20 of the example, the control routine of FIG. 3 is executed. However, a control routine of FIG. 6 may be executed. Here, the routine of FIG. 6 is the same as that of the routine of FIG. 3 except that the processing of Step S200 is executed instead of the processing of Step S100 with respect to the routine of FIG. 3 and the processing of Step S210 is added. Therefore, the same processing will be designated by the same step numbers, and the detailed description thereof will be omitted.

In the control routine of FIG. 6, the HVECU 70 inputs a stop time toff of the engine 22 in addition to the starting point water temperature Twst (Step S200). Here, the stop time toff is given by inputting a value clocked by a timer (not illustrate) as a time from the end of a previous operation of the engine 22 to the start of a current operation.

Then, in Step S110, when the starting point water temperature Twst is higher than the threshold value Twref1 and is equal to or lower than the threshold value Twref2, the stop time toff of the engine 22 is compared with the threshold value toffref (Step S210). Here, the threshold value toffref is a threshold value used to determine whether or not the temperature within the cylinder has dropped to a certain degree during the operation stop of the engine 22, for example, 25 sec, 30 sec, 35 sec, or the like can be used. The processing of this Step S210 is based on a reason it is believed that the temperature within the cylinder of the engine 22 is still relatively high and the discharge amount of particulate matter from the engine 22 does not increase so much when the stop time toff is relatively short.

In Step S210, when the stop time toff of the engine 22 is equal to or greater than the threshold value toffref, it is determined that the temperature within the cylinder has drooped to a certain degree during the operation stop of the engine 22, and the execution of the PN suppression control of the engine 22 is started (Step S140). Thereafter, the control of the engine 22 is shifted from the PN suppression control to the normal control (Steps S150 to S160), and the main routine is ended. In this case, the discharge amount of particulate matter from the engine 22 can be prevented from increasing by executing the PN suppression control.

In Step S210, when the stop time toff of the engine 22 is smaller than the threshold value toffref, it is determined that the temperature within the cylinder does not drop so much during the operation stop of the engine 22, the execution of the normal control is started without executing the PN suppression control of the engine 22 (Step S160), and the main routine is ended. In this case, by starting the execution of the normal control without executing the PN suppression control of the engine 22, the power Pe from the engine 22 can be increased, and the output from the motor MG2 and eventually the discharge power from the battery 50 can be further prevented from becoming relatively great.

Figure 7:
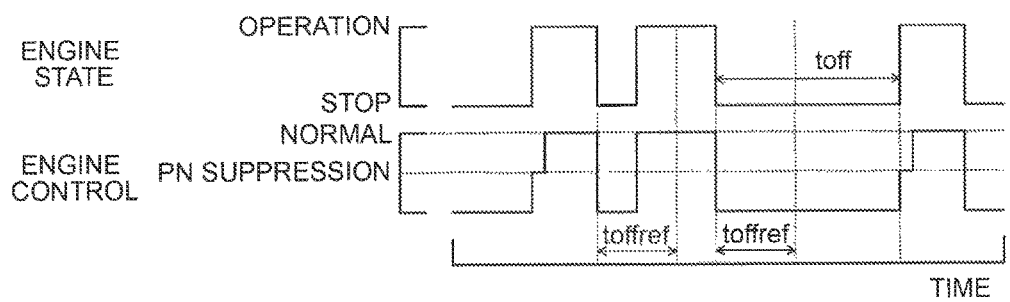
FIG. 7 is an explanatory view illustrating an example of an aspect of the state of the engine 22 and the presence/absence of execution of PN suppression control, in the case of the modification example.

FIG. 7 is an explanatory view illustrating an example of an aspect of the state and control of the engine 22, in the case of a modification example. In addition, in FIG. 7, the time when the cooling water temperature Tw is varying within a range that is higher than the threshold value Twref1 and is equal to or lower than the threshold value Twref2 is considered. As illustrated in the drawing, when the stop time toff is equal to or lower than the threshold value toffref at the start of the operation of the engine 22, a shift to the normal control is performed after the PN suppression control is executed, and when the stop time toff is smaller than the threshold value toffref, the normal control is executed without executing the PN suppression control. Accordingly, when the stop time toff is greater than the threshold value toffref, the discharge amount of particulate matter from the engine 22 can be prevented from increasing. When the stop time toff is smaller than the threshold value toffref, the output from the motor MG2 and eventually the discharge power from the battery 50 can be further prevented from becoming relatively great.

Figure 8:
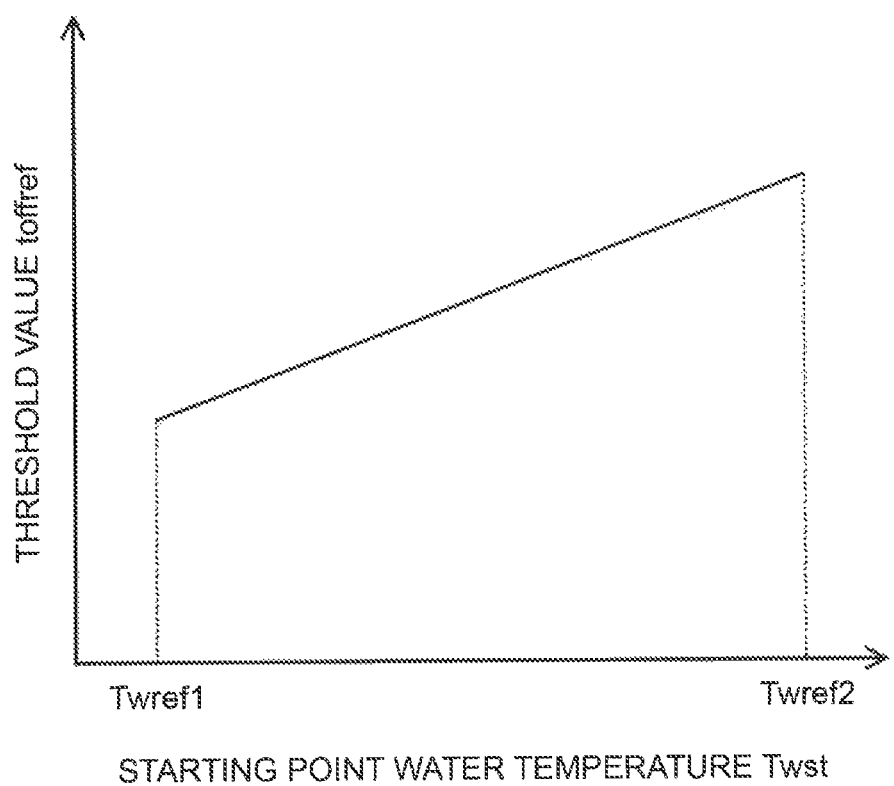
FIG. 8 is an explanatory view illustrating an example of a map in which a relationship between the starting point water temperature Twst and threshold value toffref is determined.

In this modification example, a fixed value is used as the threshold value toffref. However, the threshold value toffref may be set according to the starting point water temperature Twst. In this case, the threshold value toffref may be set, for example, by determining the relationship between the starting point water temperature Twst and the threshold value toffref and storing the relationship in advance as a map in a ROM (not illustrated), and by deriving a corresponding threshold value toffref from this map if the starting point water temperature Twst is given. An example of the map in which the relationship between the starting point water temperature Twst and the threshold value toffref is determined is illustrated in FIG. 8. In the example of FIG. 8, the threshold value toffref is set so that the upper limit power when the starting point water temperature Twst is low becomes smaller than that when the starting point water temperature is high, specifically, becomes smaller as the starting point water temperature Twst becomes lower. For example, when the starting point water temperature Twst is near the threshold value Twref1, 25 sec, 30 sec, 35 sec, or the like is set to the threshold value toffref, and when the starting point water temperature Twst is near the threshold value Twref2, 55 sec, 60 sec, 65 sec, is set to the threshold value toffref. When the starting point water temperature Twst is low, it is believed that, as compared to that when the starting point water temperature Twst is high, the temperature within the cylinder of the engine 22 is apt to be low. Therefore, whether or not the PN suppression control is executed can be more appropriately determined by setting the threshold value toffref so that the threshold value when the starting point water temperature Twst is low becomes smaller than that when the starting point water temperature is high.

Figure 9:
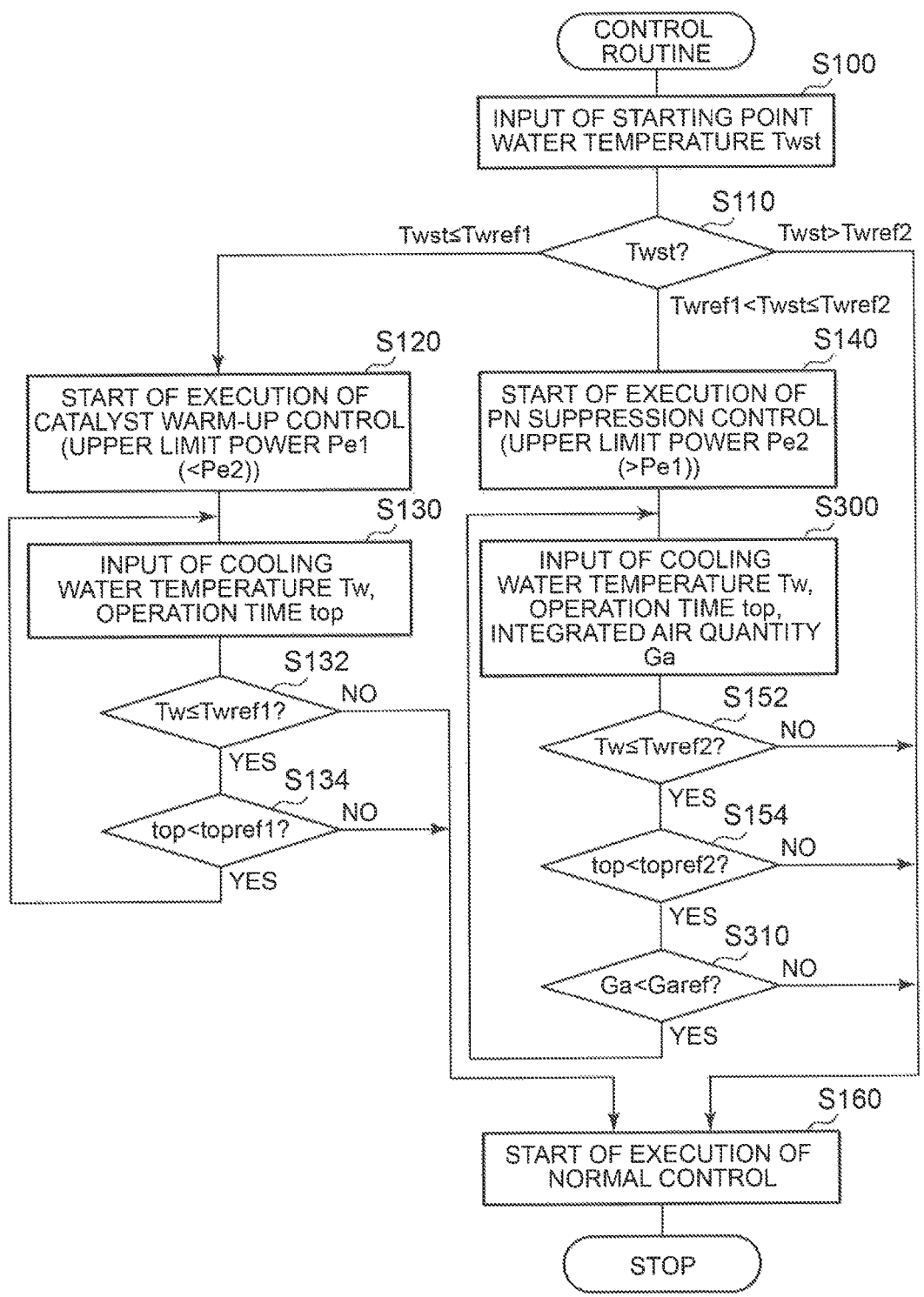
FIG. 9 is a flowchart illustrating an example of a control routine of a modification example.

In the hybrid vehicle 20 of the example, the control routine of FIG. 3 is executed. However, a control routine of FIG. 9 may be executed. Here, the routine of FIG. 9 is the same as that of the routine of FIG. 3 except that the processing of Step S300 is executed instead of the processing of Step S150 with respect to the routine of FIG. 3 and the processing of Step S310 is added. Therefore, the same processing will be designated by the same step numbers, and the detailed description thereof will be omitted.

In the control routine of FIG. 9, the HVECU 70 inputs an integrated air quantity Ga of the engine 22 (Step S300), in addition to the cooling water temperature Tw of the engine 22 and the operation time top of the engine 22, similar to Step S150 of FIG. 2, if the execution of the PN suppression control is started (Step S140). Here, the integrated air quantity Ga of the engine 22 is given by inputting a value, which is calculated as an integrated value from the start of the operation of the engine 22 of the quantity Qa of intake air from the air flow meter 148, through communication from the engine ECU 24.

Subsequently, the cooling water temperature Tw of the engine 22 is compared with the threshold value Twref2 (Step S152), the operation time top of the engine 22 is compared with the threshold value topref2 (Step S154), the integrated air quantity Ga of the engine 22 is compared with the threshold value Garef (Step S310), and a return to Step S150 is performed when the cooling water temperature Tw of the engine 22 is equal to or lower than the threshold value Twref2 and the operation time top of the engine 22 is smaller than the threshold value topref2 and when the integrated air quantity Ga is smaller than the threshold value Garef. Then, while the processing of Steps S150 to S310 is executed, when the cooling water temperature Tw of the engine 22 becomes equal to or higher than the threshold value topref2 in Step S152, when the operation time top of the engine 22 becomes higher than the threshold value Twref2 in Step S154, or when the integrated air quantity Ga of the engine 22 becomes greater than the threshold value Garef in Step S310, the execution of the PN suppression control of the engine 22 is ended, the execution of the normal control is started (Step S160), and the main routine is ended. Here, the threshold value Garef is a threshold value used to determine whether or not the execution of the PN suppression control may be ended (whether a shift to the normal control may be performed). As the threshold value Garef, for example, 15 g, 17 g, 20 g, or the like can be used.

In this way, when the cooling water temperature Tw of the engine 22 becomes higher than the threshold value Twref2, when the operation time top of the engine 22 becomes equal to or higher than the threshold value topref2, or when the integrated air quantity Ga of the engine 22 becomes greater than the threshold value Garef, that is, when the conditions of the integrated air quantity Ga are satisfied even if the condition of the cooling water temperature Tw and the condition of the operation time top are not satisfied, the execution time of the PN suppression control can be further prevented from becoming relatively long by shifting the control of the engine 22 from the PN suppression control to the normal control.

Figure 10:
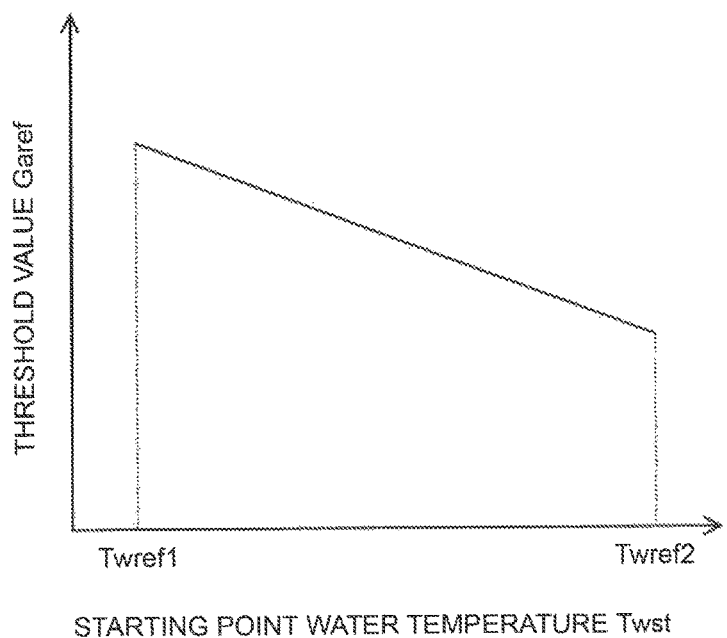
FIG. 10 is an explanatory view illustrating an example of a map in which a relationship between the starting point water temperature Twst and threshold value Garef is determined.

In this modification example, a fixed value is used as the threshold value Garef. However, the threshold value Garef may be set according to the starting point water temperature Twst. In this case, the threshold value Garef is set, for example, by determining the relationship between the starting point water temperature Twst and the threshold value Garef and storing the relationship in advance as a map in a ROM (not illustrated), and by deriving a corresponding threshold value Garef from this map if the starting point water temperature Twst is given. An example of the map in which the relationship between the starting point water temperature Twst and the threshold value Garef is determined is illustrated in FIG. 10. In the example of FIG. 10, the threshold value Garef is set so as to become greater when the starting point water temperature Twst is low than when the starting point water temperature is high, specifically, becomes greater as the starting point water temperature Twst becomes lower. For example, when the starting point water temperature Twst is near the threshold value Twref1, 15 g, 17 g, 20 g, or the like is set to the threshold value Garef; and when the starting point water temperature Twst is near the threshold value Twref2, 8 g, 10 g, 12 g, is set to the threshold value Garef. As described above, when the starting point water temperature Twst is low, it is believed that, as compared to that when the starting point water temperature Twst is high, the temperature within the cylinder of the engine 22 is low and the discharge amount of particulate matter from the engine 22 is apt to increase. Therefore, the execution time (time for suppressing particulate matter from the engine 22) of the PN suppression control can be made more suitable by setting the threshold value Garef so as to become greater when the starting point water temperature Twst is low than that when the starting point water temperature Twst is high.

Figure 11:
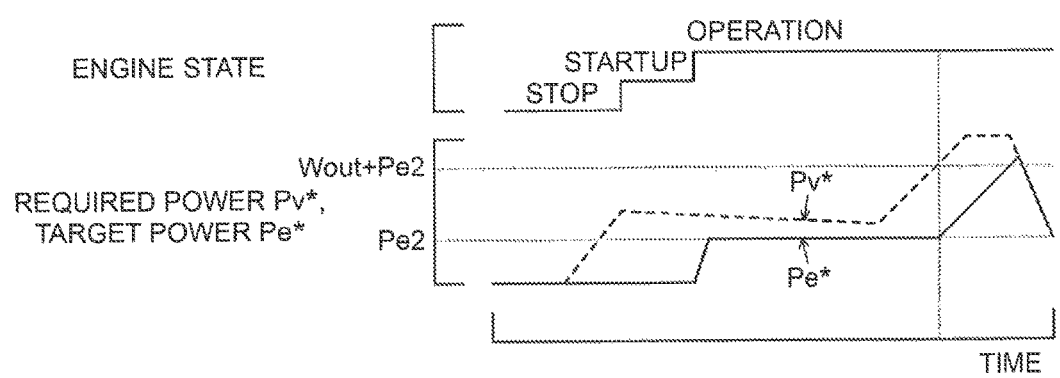
FIG. 11 is an explanatory view illustrating an example of an aspect when the PN suppression control in the case of the modification example is executed.

In the hybrid vehicle 20 of the example, when the PN suppression control is executed, the required power Pv* of the vehicle is limited to the upper limit power Pe2 and the target power Pe* of the engine 22 is set. However, as illustrated in FIG. 11, when the required power Pv* of the vehicle becomes greater than a sum (Wout+Pe2) of the load limit Wout of the battery 50 and the upper limit power Pe2, the target power Pe* of the engine 22 may be made greater than the upper limit power Pe2. If this is the case, it is possible to further cope with the accelerator operation of a driver.

In the hybrid vehicle 20 of the example, when the catalyst warm-up control is executed, the required power Pv* of the vehicle is limited to the upper limit power Pe1 and the target power Pe* of the engine 22 is set, and when the PN suppression control is executed, the required power Pv* of the vehicle is limited to the upper limit power Pe2 and the target power Pe* of the engine 22 is set. However, when the catalyst warm-up control is executed, the upper limit power Pe1 may be set to the target power Pe* irrespective of the required power Pv*, and when the PN suppression control is executed, the upper limit power Pe2 may be set to the target power Pe* irrespective of the required power Pv*.

In the hybrid vehicle 20 of the example, during the execution of the catalyst warm-up control, when the cooling water temperature TW of the engine 22 becomes higher than the threshold value Twref1 or when the operation time top of the engine 22 becomes equal to or higher than the threshold value topref1, the control of the engine 22 is shifted from the catalyst warm-up control to the normal control. However, during the execution of the catalyst warm-up control, when the cooling water temperature Tw becomes higher than the threshold value Twref1 in a relatively short time (for example, the operation time top is a time that is shorter than the above-described threshold value topref2), the control of the engine 22 may be shifted to the normal control after being transferred from the catalyst warm-up control to the PN suppression control. The execution time of the PN suppression control in this case can be, for example, a time obtained by subtracting the execution time of the catalyst warm-up control from the threshold value topref2.

Figure 12:
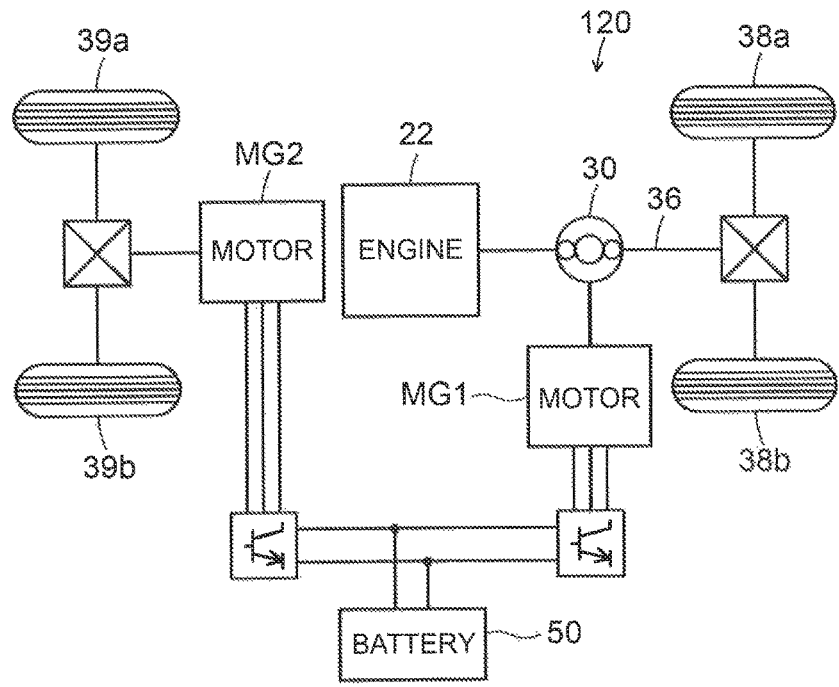
FIG. 12 is a configuration view illustrating the outline of the configuration of a hybrid vehicle 120 of a modification example.

In the hybrid vehicle 20 of the example, the power from the motor MG2 is output to the driving shaft 36 connected to the driving wheels 38a, 38b. However, as illustrated in a hybrid vehicle 120 of a modification example of FIG. 12, the power from the motor MG2 may be output to a vehicle axle (a vehicle axle connected to wheels 39a, 39b in FIG. 12) that is different from a vehicle axle (a vehicle axle connected to the driving wheels 38a, 38b) to which the driving shaft 36 is connected. Even in the case of this hardware configuration, the same effects as the example can be exhibited by executing the control routine of FIG. 3, or the like, similar to the example.

Figure 13:
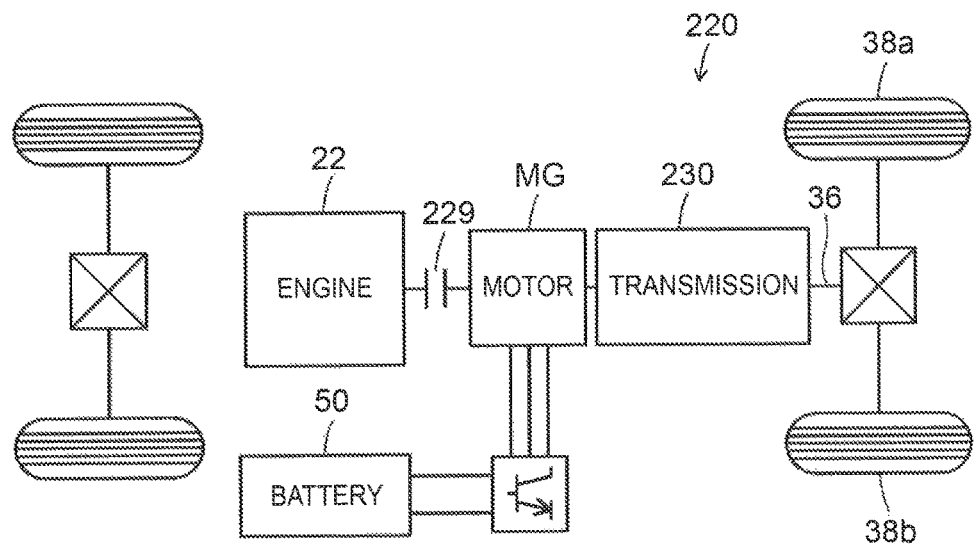
FIG. 13 is a configuration view illustrating the outline of the configuration of a hybrid vehicle 220 of a modification example.

In the hybrid vehicle 20 of the example, the power from the engine 22 is output to the driving shaft 36 connected to the driving wheels 38a, 38b via the planetary gear 30, and the power from the motor MG2 is output to the driving shaft 36. However, as illustrated in a hybrid vehicle 220 of a modification example of FIG. 13, a configuration in which a motor MG is connected to the driving shaft 36 connected to the driving wheels 38a, 38b via a transmission 230 and the engine 22 is connected to a rotating shaft of the motor MG via a clutch 229 may be adopted, and the power from the engine 22 may be output to the driving shaft 36 via the rotating shaft of the motor MG, and the transmission 230, and the power from the motor MG may be connected to the driving shaft via the transmission 230. Even in the case of this hardware configuration, the same effects as the example can be exhibited by executing the control routine of FIG. 3, or the like, similar to the example.

Correspondence relationships between the main elements of the example and the main elements of the disclosure described in the column of the means for solving the problems will be described. In the example, the engine 22 may be regarded as an "engine", the motor MG2 may be regarded as a "motor", the battery 50 is equivalent to a "battery", and the HVECU 70, the engine ECU 24, and the motor ECU 40 may be regarded as "a controller".

In addition, since the correspondence relationships between the main elements of the example and the main elements of the disclosure described in the column of means for solving the problems are examples for specifically describing modes for carrying out the disclosure described in the column of the means for the example to solve the problems, the disclosure is not limited to the elements of the disclosure described in the column of the means for solving the problems. That is, interpretation about the disclosure described in the column of the means for solving the problems should be performed on the basis of the description of the column, and the example are merely specific examples of the disclosure described in the column of the means for solving the problems.

Although the modes for carrying out the disclosure have been described above using the example, the disclosure is not limited to such example at all, and can be naturally carried out in various forms without departing from the scope of the disclosure.

The disclosure is available for a hybrid vehicle manufacturing industry, and the like.

What is claimed is:

1. A hybrid vehicle by comprising:
an engine and a motor for driving;
a battery that exchanges power with the motor;
a controller configured to control the engine and the motor so that the engine is driven depending on a required output for driving while being intermittently operated,
wherein the control controller,
executes normal control in which the engine is controlled so that a target output of the engine according to the required output is output from the engine when a starting point water temperature that is a cooling water temperature at the start of the operation of the engine is higher than a second predetermined temperature higher than a first predetermined temperature,
executes first control in which the engine is controlled so that an output of the engine is limited to a first predetermined output or lower and a catalyst of an exhaust gas control apparatus of the engine is warmed up when the starting point water temperature is equal to or lower than the first predetermined temperature, and then shifts to the normal control when the cooling water temperature becomes higher than the first predetermined temperature or when a first predetermined time has lapsed from the start of the operation of the engine, and
executes second control in which the engine is controlled so that the output of the engine is limited to a second predetermined output or lower that is greater than the first predetermined output and a discharge amount of particulate matter from the engine is suppressed when the starting point water temperature is higher than the first predetermined temperature and is equal to or lower than the second predetermined temperature, and then shifts to the normal control when the cooling water temperature becomes higher than the second predetermined temperature or when a second predetermined time has lapsed from the start of the operation of the engine.

2. The hybrid vehicle according to claim 1,
wherein the second predetermined output is set so that the second predetermined output when the starting point water temperature is low becomes smaller than that when the starting point water temperature is high.

3. The hybrid vehicle according to claim 1,
wherein the second predetermined time is set so that the second predetermined time when the starting point water temperature is low becomes longer than that when the starting point water temperature is high.

4. The hybrid vehicle according to claim 1,
wherein when the starting point water temperature is higher than the first predetermined temperature and is equal to or lower than the second predetermined temperature, the controller is configured to shift to the normal control after the second control is executed when a stop time from the end of a previous operation of the engine to the start of a current operation of the engine is equal to or greater than a third predetermined time, and executes the normal control without executing the second control when the stop time is smaller than the third predetermined time.

5. The hybrid vehicle according to claim 4,
wherein the third predetermined time is set so that the third predetermined time when the starting point water temperature is low becomes shorter than that when the starting point water temperature is high.

6. The hybrid vehicle according to claim 1,
wherein the controller is configured to shift to the normal control when an integrated air quantity from the start of the operation of the engine reaches a predetermined air quantity or greater even when the cooling water temperature is maintained lower than the second predetermined temperature and a time form the start of the operation of the engine is within the second predetermined time, during the execution of the second control.

7. The hybrid vehicle according to claim 6,
wherein the predetermined air quantity is set so that the predetermined air quantity when the starting point water temperature is low becomes greater than that when the starting point water temperature is high.

\* \* \* \* \*